(12) United States Patent
Murase

(10) Patent No.: US 8,498,997 B2
(45) Date of Patent: Jul. 30, 2013

(54) SERVER IMAGE MIGRATION

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 12/564,948

(22) Filed: Sep. 23, 2009

(65) Prior Publication Data
US 2011/0071983 A1 Mar. 24, 2011

(51) Int. Cl.
*G06F 7/00* (2006.01)
*G06F 17/00* (2006.01)
*G06F 17/30* (2006.01)

(52) U.S. Cl.
USPC ............ 707/764; 707/827; 707/831; 707/899

(58) Field of Classification Search
USPC .................. 707/203, 679; 711/6; 718/1, 104
See application file for complete search history.

(56) References Cited

U.S. PATENT DOCUMENTS

| | | | |
|---|---|---|---|
| 7,287,132 B2 | 10/2007 | Takahashi et al. | |
| 7,360,046 B2 * | 4/2008 | Shono et al. | 711/162 |
| 7,383,405 B2 | 6/2008 | Vega et al. | |
| 7,509,467 B2 | 3/2009 | Nagata et al. | |
| 2005/0240803 A1 | 10/2005 | Saika et al. | |
| 2006/0031637 A1 | 2/2006 | Komikado et al. | |
| 2008/0034365 A1 * | 2/2008 | Dahlstedt | 718/1 |
| 2008/0134175 A1 | 6/2008 | Fitzgerald et al. | |
| 2008/0244205 A1 | 10/2008 | Amano et al. | |
| 2008/0320051 A1 | 12/2008 | Murotani et al. | |
| 2009/0300076 A1 * | 12/2009 | Friedman et al. | 707/203 |
| 2009/0300641 A1 * | 12/2009 | Friedman et al. | 718/104 |
| 2010/0153617 A1 * | 6/2010 | Miroshnichenko et al. | 711/6 |
| 2010/0250499 A1 * | 9/2010 | McAlister et al. | 707/679 |

OTHER PUBLICATIONS

3PAR Inc., "3PAR Server Provisioning Solutions", http://www.3par.com/SiteObjects/A7B11BEED3AC16DF15CA5A82011BF265/3PAR-sp-ds-08.1.pdf., 2008, 3PAR Inc., 1 page.

* cited by examiner

*Primary Examiner* — Susan Chen
(74) *Attorney, Agent, or Firm* — Mattingly & Malur, PC

(57) ABSTRACT

A system includes a first site having a first server and a first storage system, a second site including a second server and a second storage system, and a third site coupled to the first and second sites, the third site having gold images. A method of migrating a virtual server image comprises storing a first gold image at the first site; storing a second gold image at the second site; creating a first snapshot volume at the first site based on the first gold image; sending the first gold image ID, update data of the first gold image, and address information for the update data, from the first site to the second site; creating a second snapshot volume at the second site based on the second gold image corresponding to the first gold image ID; allocating storage for storing the update data at the second site with reference to the address information; and storing the update data in the allocated storage.

20 Claims, 14 Drawing Sheets

Hardware Architecture

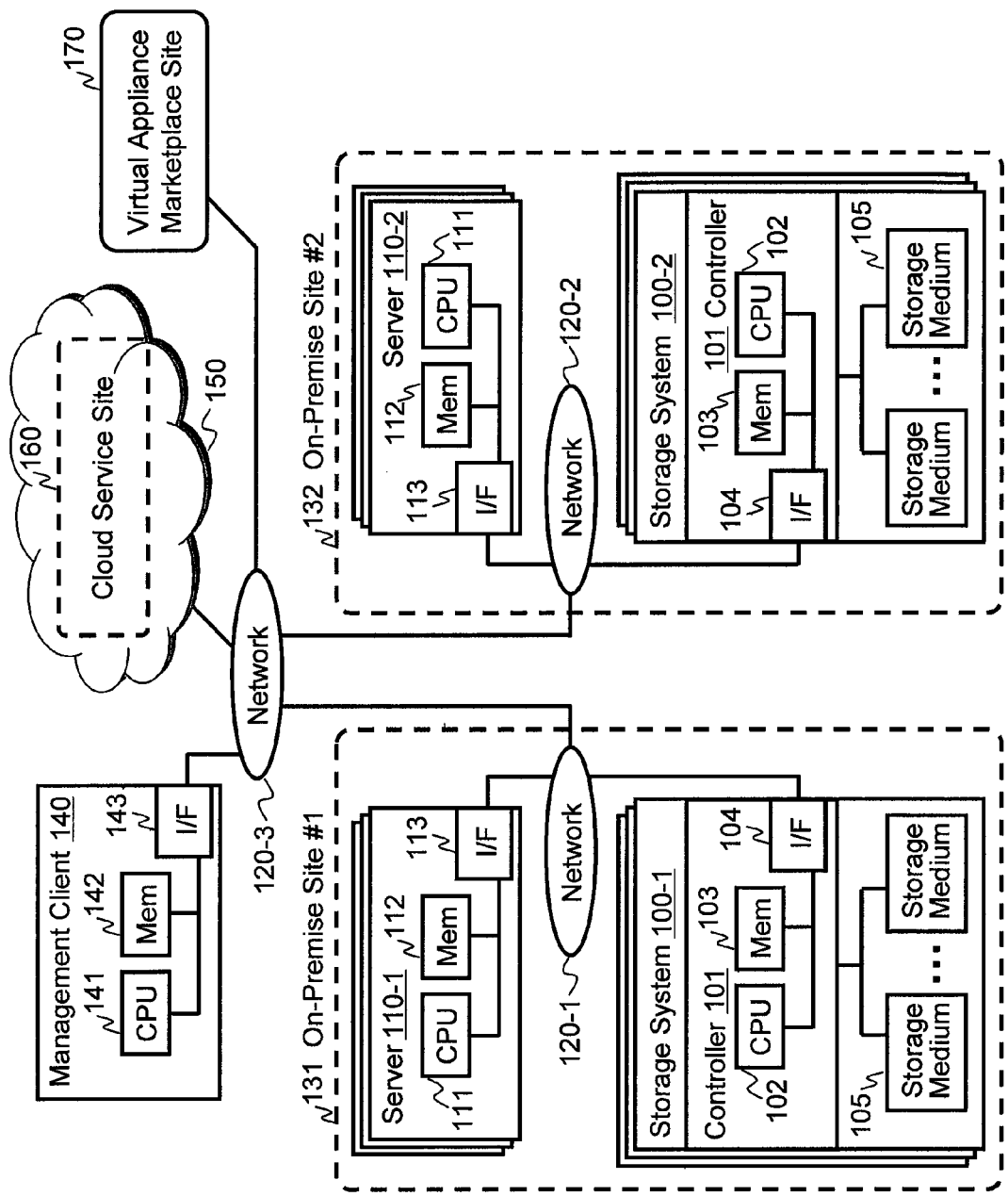
FIG. 1 Hardware Architecture

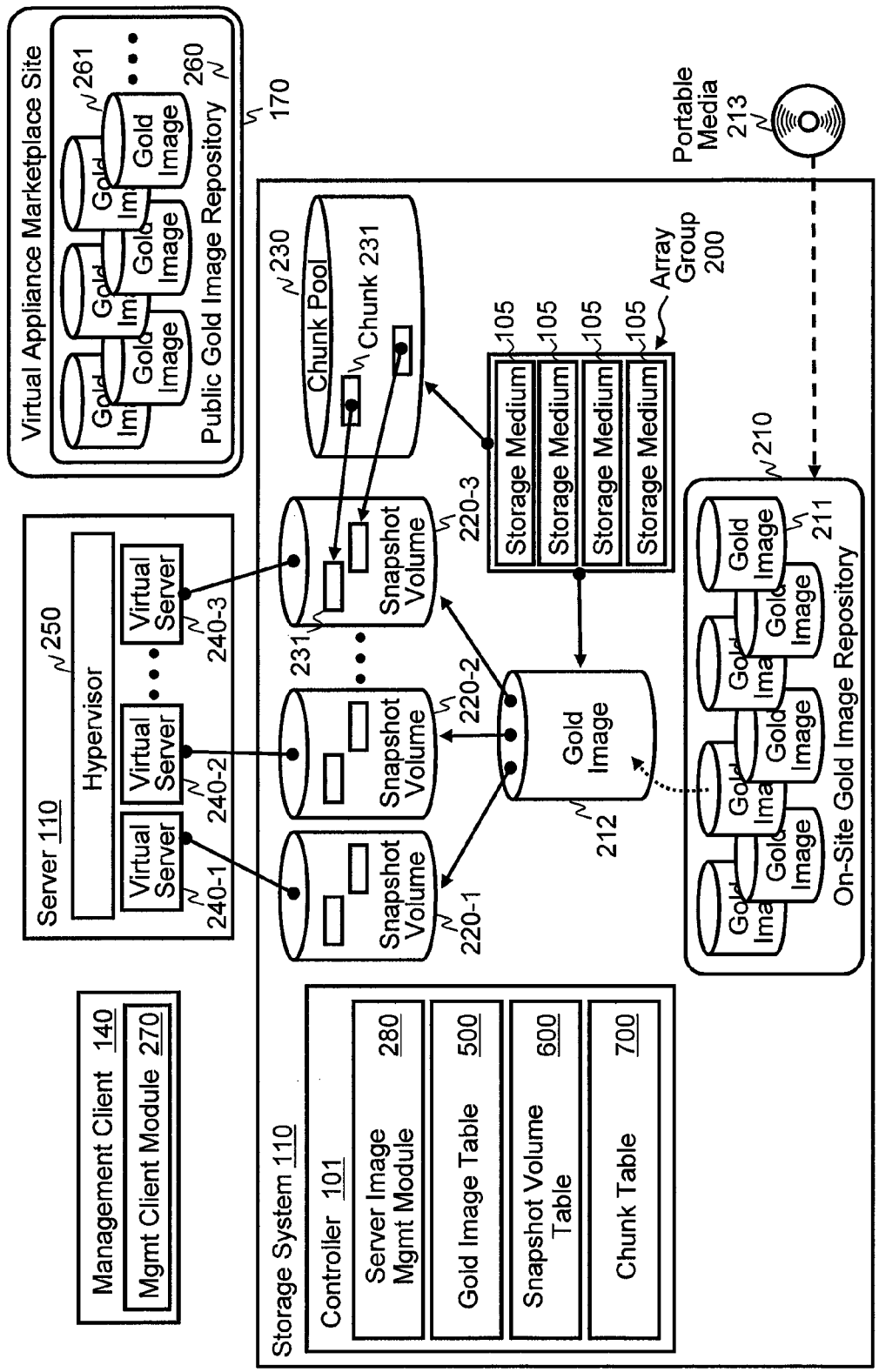
FIG. 2 Logical Element Structure

| Gold Image ID | Producer | Creation Time |
|---|---|---|
| G100 | Vendor A | 2008.12.01 10:00 |
| G200 | Vendor B | 2009.04.23 12:00 |
| ... | ... | ... |

FIG. 3 Data Structure of Gold Image Table

| Snapshot Volume ID | Parent Gold Image ID | Virtual WWN |
|---|---|---|
| SV101 | G100 | 501111100000000A1 |
| SV102 | G100 | 502222200000000B1 |
| SV201 | G200 | 503333300000000C1 |
| ... | ... | ... |

FIG. 4 Data Structure of Snapshot Volume Table

Figure 5:
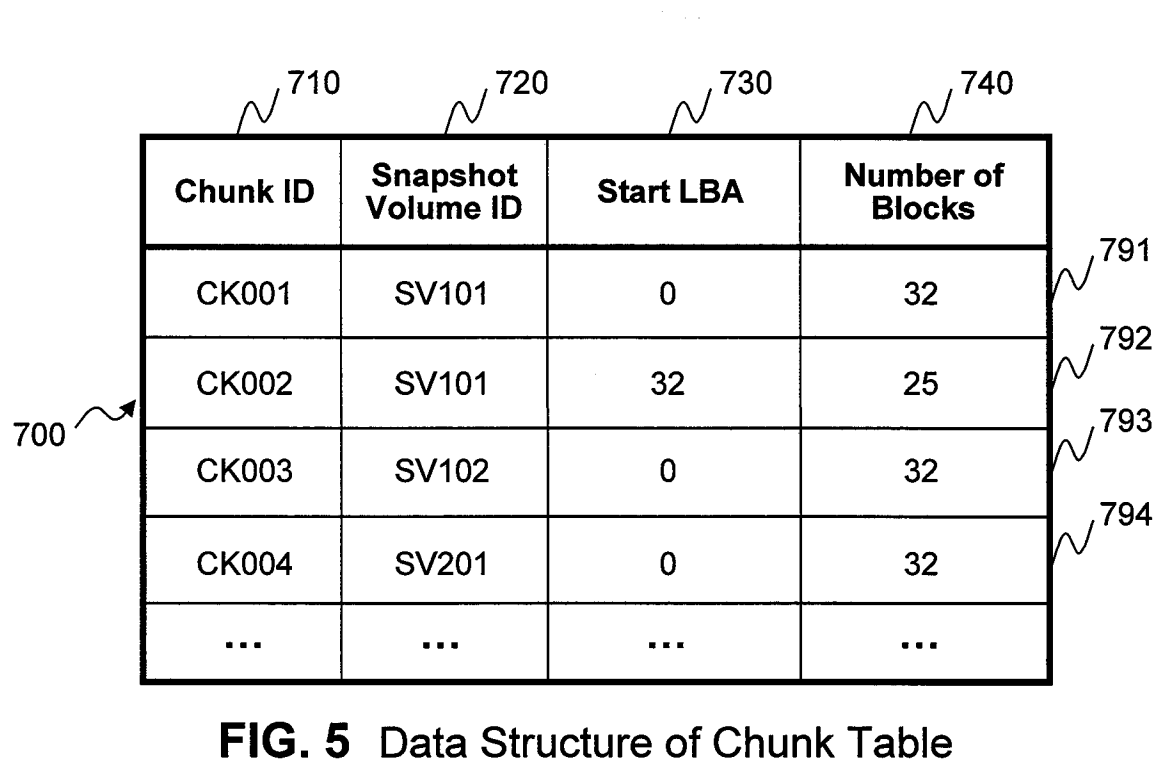

| Chunk ID | Snapshot Volume ID | Start LBA | Number of Blocks |
|---|---|---|---|
| CK001 | SV101 | 0 | 32 |
| CK002 | SV101 | 32 | 25 |
| CK003 | SV102 | 0 | 32 |
| CK004 | SV201 | 0 | 32 |
| ... | ... | ... | ... |

FIG. 5 Data Structure of Chunk Table

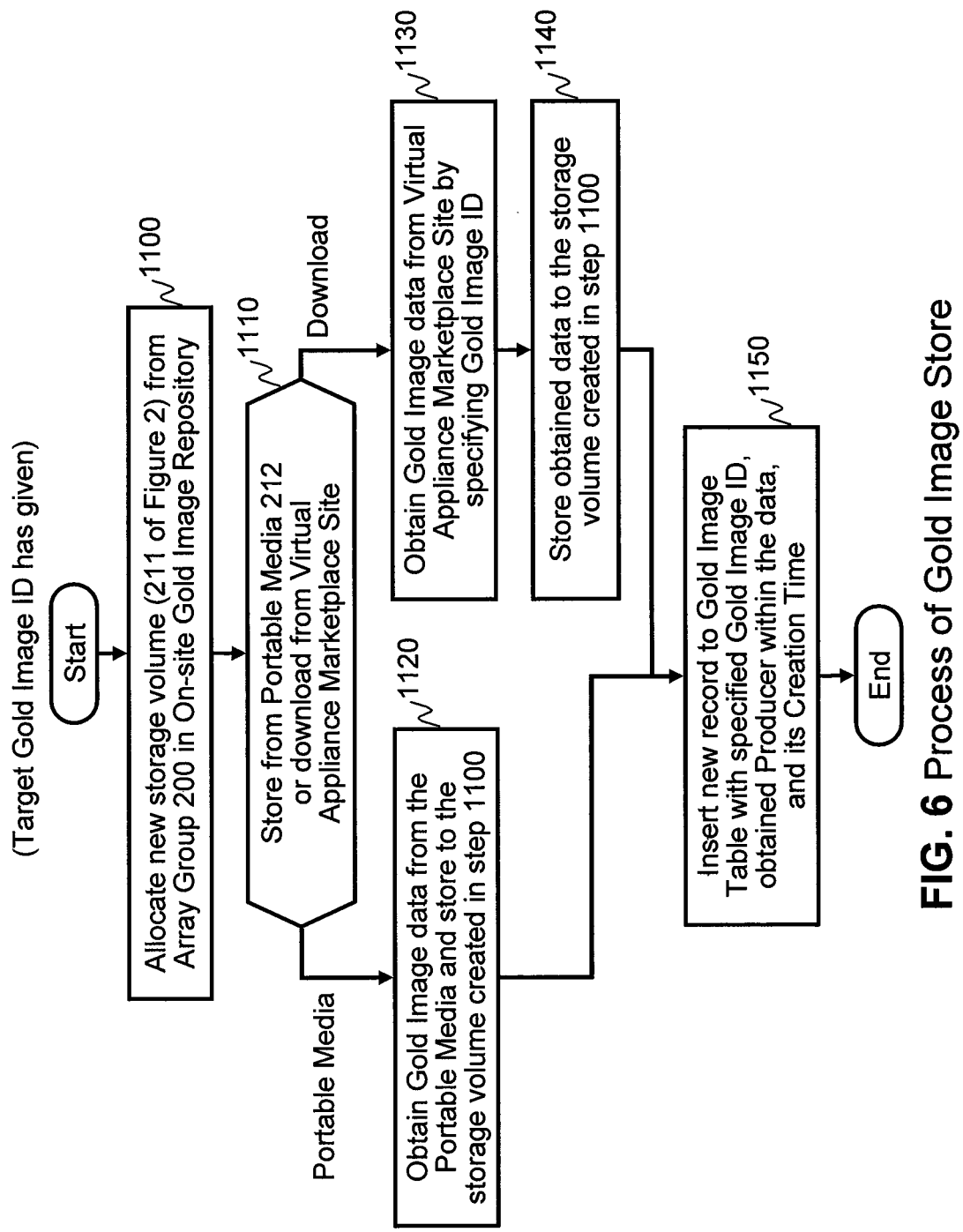
FIG. 6 Process of Gold Image Store

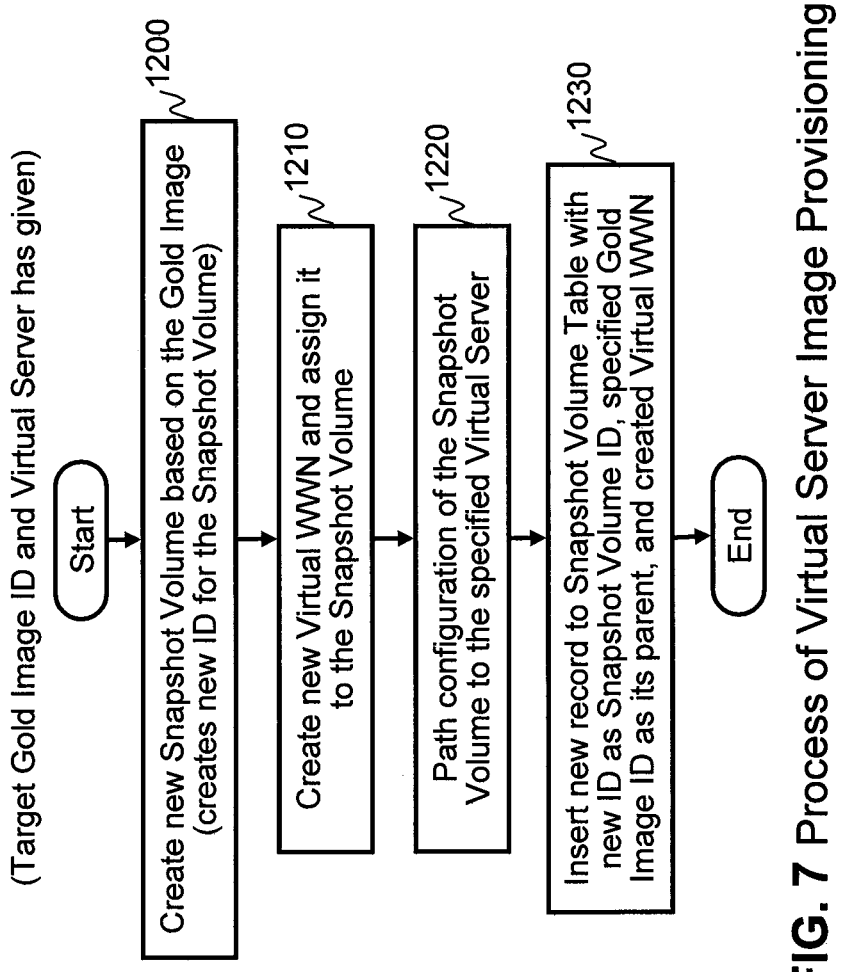
FIG. 7 Process of Virtual Server Image Provisioning

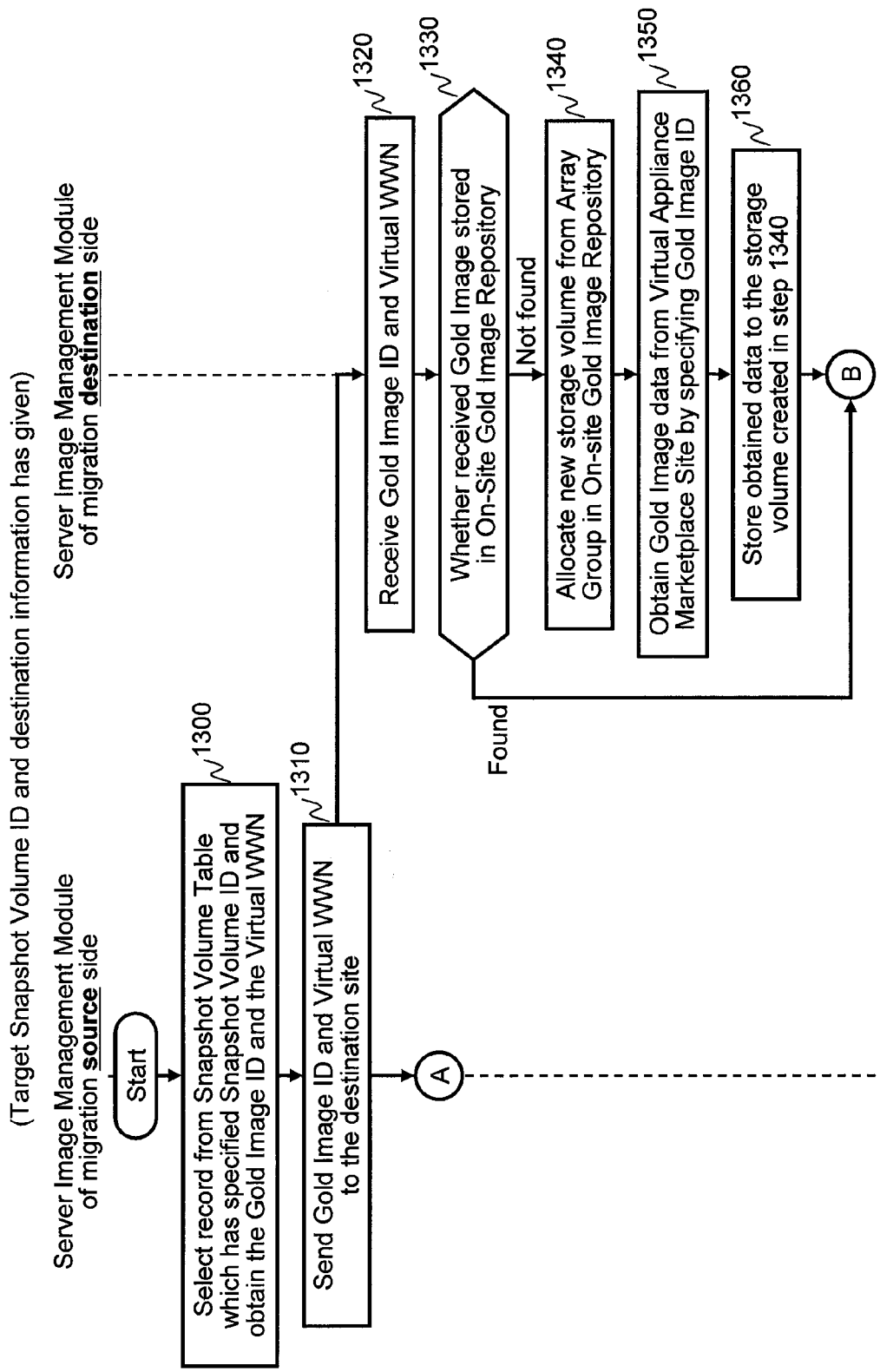
FIG. 8 Process of Virtual Server Image Migration (a)

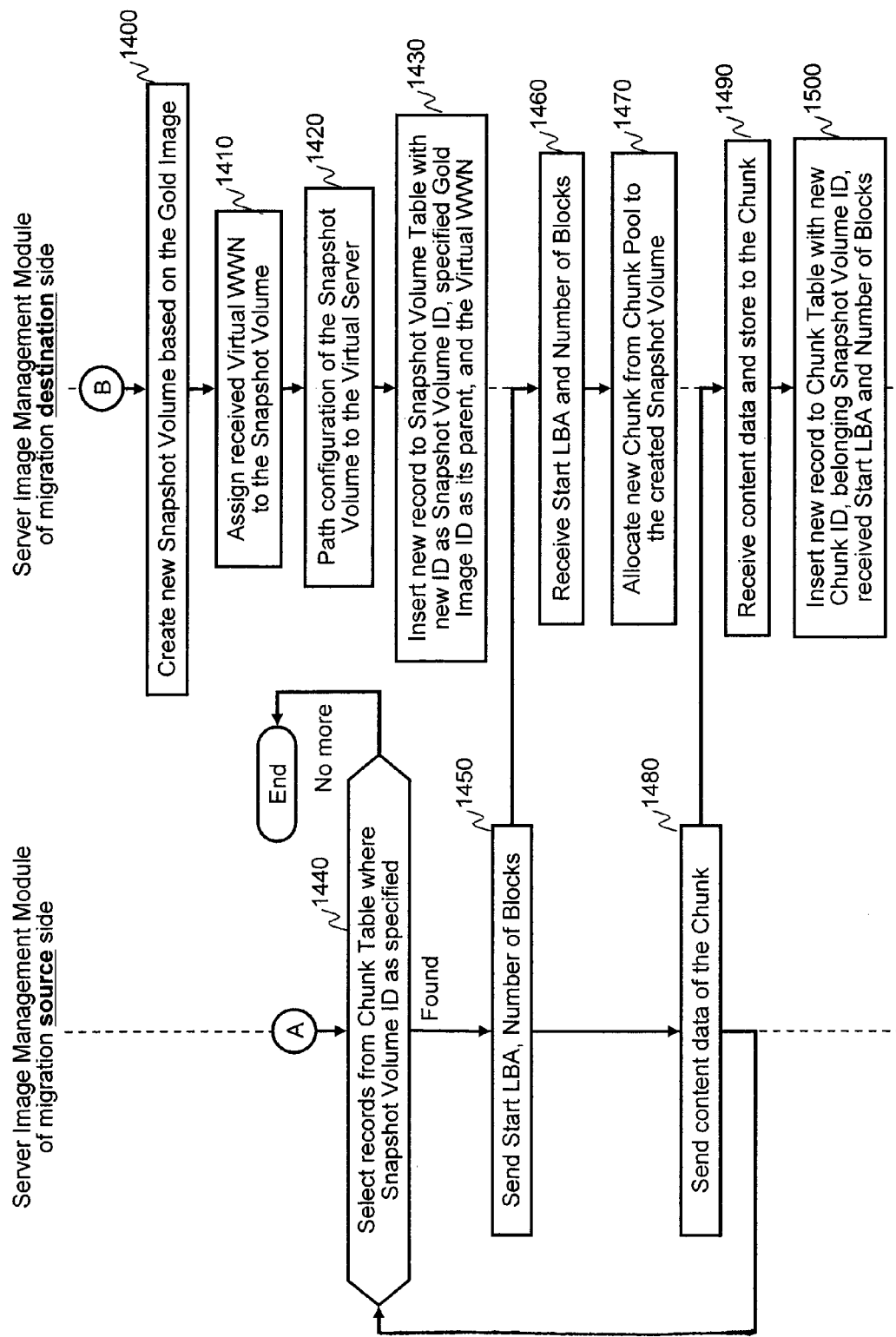
FIG. 9 Process of Virtual Server Image Migration (b)

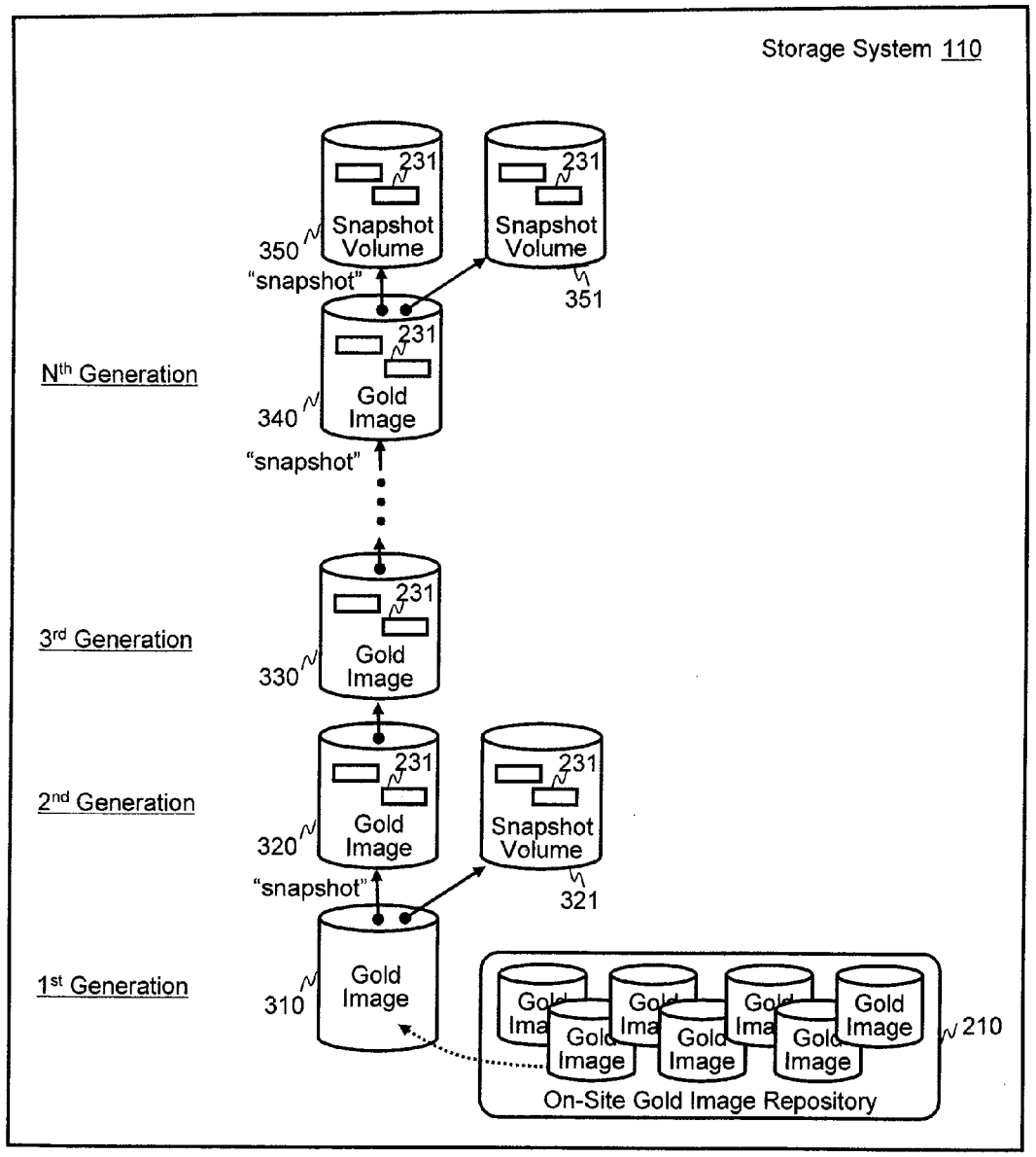
FIG. 10 Logical Element Structure

| Gold Image ID | Producer | Creation Time |
|---|---|---|
| G100 | Vendor A | 2008.12.01 10:00 |
| G310 | Vendor B | 2009.04.23 12:00 |
| G320 | Internal | 2009.05.05 15:00 |
| G330 | Internal | 2009.07.01 10:00 |
| G340 | Internal | 2009.07.03 12:00 |
| ... | ... | ... |

FIG. 11 Data Structure of Gold Image Table

| Snapshot Volume ID | Parent Gold Image ID | Virtual WWN |
|---|---|---|
| SV320 | G310 | 5011111100000000A1 |
| SV321 | G310 | 5022222200000000B1 |
| SV330 | SV320 | 5033333300000000C1 |
| ... | ... | ... |
| SV340 | ... | ... |
| SV350 | SV340 | 5044444400000000D1 |
| SV351 | SV340 | 5055555500000000E1 |
| ... | ... | ... |

FIG. 12 Data Structure of Snapshot Volume Table

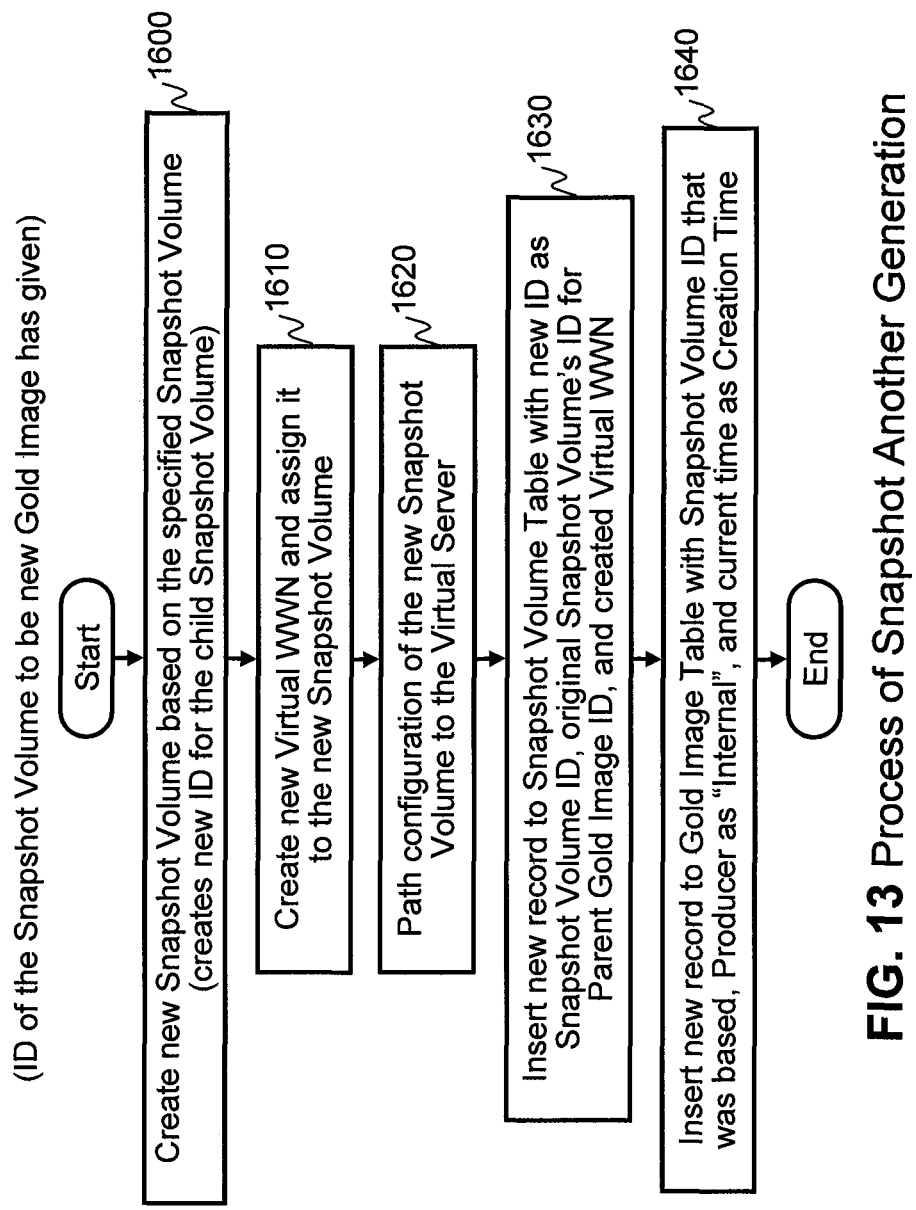
FIG. 13 Process of Snapshot Another Generation

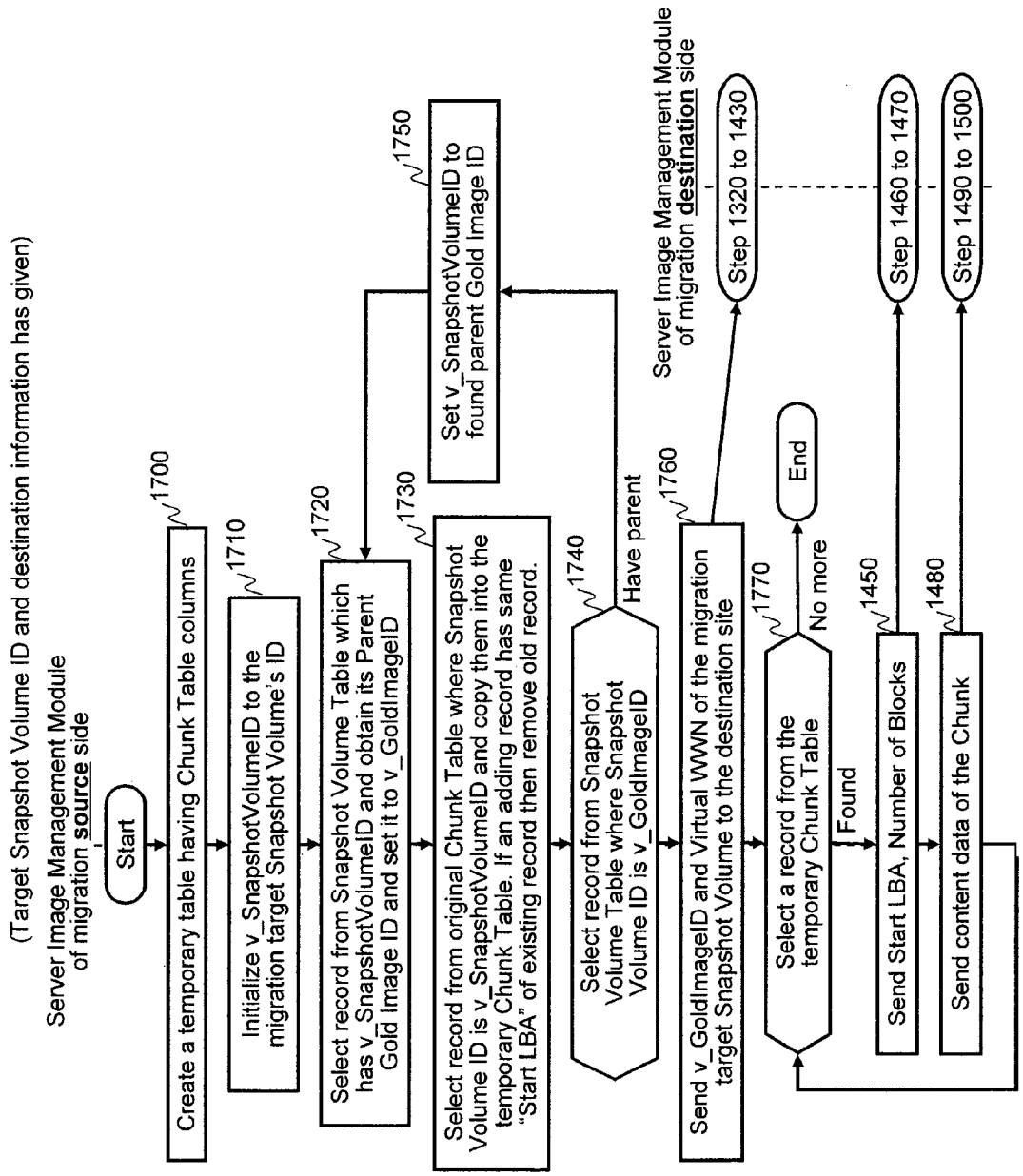
FIG. 14 Process of Virtual Server Image Migration

SERVER IMAGE MIGRATION

BACKGROUND OF THE INVENTION

The present invention relates generally to storage systems and, more particularly, to server image migration.

Rapid penetration of virtual server deployment in enterprise datacenters is one of the biggest trends in the IT world today. Not only the OS (operating system) itself but also Virtual Appliance (which is the coupled program image that is able to deploy on the hypervisor that is composed of OS, middleware and some objective dedicated application) is becoming a major option of virtual server image provisioning. It is a very easy thing to do since there are virtual appliances marketplaces (e.g., http://www.vmware.com/appliances) and the administrator can just download the program and will be ready to start it just as an appliance. Also, virtual server technology is one of the very important enablers for the cloud computing services. A wide variety of cloud services are emerging; it is believed that many enterprises will rely on the cloud services as one of the options for their IT resources.

As more virtual server deployment becomes easier, more virtual server sprawl has been seen recently. In addition, the size of each virtual server image (which means including required middleware and applications) has been rapidly growing due to the enrich functions. As a result of this combination, a datacenter needs to have a storage system of a very large size to hold virtual server images.

To optimize the total size of the virtual server images deployed in a datacenter, writeable snapshot technology has the potential to address the issue. For the use of writeable snapshot technology to reduce the virtual server image capacity, see, e.g., http://www.3par.com/SiteObjects/A7B11BEED3AC16DF15CA5A82011BF265/3PAR-sp-ds-08.1.pdf. Moreover, Fitzgerald disclosed a management technique of virtual server instances in US20080134175 A1. It mentioned having a snapshot-like configuration in the system. Also, it describes the virtual server image distribution behavior from the repository to a host. However, Fitzgerald did not teach how to reduce the data copy amount of the image during the migration, as disclosed in the present invention.

Because the deployment of a plurality of virtual server images has very large portion of redundant data due to the fact that they hold the same OS, middleware, and applications, and just a little portion of customized area, a snapshot mechanism works well to eliminate the redundant portion while keeping the presenting of the plurality of virtual server images (virtually). The original image is called the "Gold Image." When a new virtual server instance is needed, a snapshot volume of the Gold Image will be created and connected to the virtual server. The snapshot volume is just a logical volume but the data read access can be done by actual read of the corresponding portion of data on the Gold Image. When a write access comes, it will then allocate a little capacity chunk to the snapshot volume and hold the specific data written, and this is the "customized part" from the original data of the Gold Image. With this virtualization technique only the customized data will be newly allocated and the original data part will not be allocated to the respective virtual server image volume. Thus, the total size of storage will be optimized.

However, a new issue is raised from a different aspect, namely, the size of data copy during virtual server migration between systems/sites. The deployment of virtual server technology has made it significantly easier to move server instance from one place to another, such as "VMotion" function of VMware. Typically the function is used to move virtual server instances from the test environment to the production site. However, from now on, the more dynamic use case such as for workload balancing within the total datacenter or disaster recovery use between local and remote sites will become more popular. Another major use case assumed involves moving virtual server from the enterprise on-premise datacenter to the outside cloud service system. Thus, there will be a huge potential for the case where the user needs to migrate a virtual server between datacenters. Unfortunately, although the writeable snapshot technology optimizes the capacity within a storage system by eliminating the redundant portion, when it needs to be transferred to somewhere outside of the system, such as a cloud service system, the whole size of the virtual server image needs to be transferred. Since each size of the image will become larger and the number of migration will become huge, a very large data size of (remote) copy will be needed.

A number of references disclose how to reduce the data copy amount when the replication source and destination volumes are fixed and originally configured in the first place. None of them teach minimizing the data copy size in the situation where the destination of the migration can be varied and be determined dynamically. See, e.g., U.S. Pat. No. 7,287,132 B2, U.S. Pat. No. 7,383,405 B2, U.S. Pat. No. 7,509,467 B2, US20060031637 A1, US20080244205 A1, and US20080320051 A1.

BRIEF SUMMARY OF THE INVENTION

Exemplary embodiments of the invention provide a solution to minimize the data needed to be copied during virtual server migration, particularly in the era of the number of virtual server migration processes required between storage systems within a datacenter, from local to remote enterprise datacenters, or from an enterprise on-premise datacenter to a cloud service system. The methods and apparatuses of the invention can be used on an IT system which utilizes virtual server technology to deploy new server workload instance, especially where the server workload is migrated between one system and another including on-premise sites, remote sites, and cloud services.

A storage system has an On-site Gold Image Repository to hold Gold Images that will be used as the base of a snapshot volume during the creation/provisioning of a new virtual server instance. During the new virtual server image provisioning, it will not copy the whole data of the selected Gold Image but will only create a snapshot volume as the new server image. When a write access request is directed to the snapshot volume and if no capacity has yet been allocated to the specific address, then a new capacity chunk of a relatively small size will be allocated to the snapshot volume and the requested data will be stored. If the chunk has already been allocated to the address, then the content will be overwritten. Thus, for each snapshot volume, any information that has been customized and its data content will be managed by the storage system. When a read access request is directed to the snapshot volume and if the snapshot volume has customized data for the address, then it responds with the specific content of data; but if the snapshot does not have updated data at the specific address, then data on the Gold Image will be returned. Once a virtual server migration is requested, the storage system on the copy source side sends a derived root Gold Image ID, data updated portion information of the snapshot volume, and content data of the updated portion, to the storage system at the destination side. On the destination side, the storage system receiving the data then looks up the actual Gold Image having the received Gold Image ID in its On-site Gold Image Repository, provisions a new virtual server image (i.e., creates a snapshot volume of the Gold Image), and updates it based upon the address information and data content sent from source side. By using configuration information of the writeable snapshot volumes, which was originally purposed to optimize the total size of capacity within a system, the virtual server image migration process of the invention does not send the entire data of virtual server image but sends only the root Gold Image ID and any differential portion of the data for the virtual server instance, thereby dramatically reducing the data amount of copy.

An aspect of the present invention is directed to a method of migrating a virtual server image in a system which includes a first site, a second site, and a third site, the first site having a first server and a first storage system coupled to the server via a first network, the second site including a second server and a second storage system coupled to the second server via a second network, the third site being coupled to the first site and the second site, the third site having a plurality of gold images, the virtual server image being migrated using the gold images. The method comprises storing a first gold image at the first site; storing a second gold image at the second site; creating a first snapshot volume at the first site based on the first gold image, the first gold image corresponding to a first gold image ID; sending the first gold image ID, update data of the first gold image, and address information for the update data, from the first site to the second site; creating a second snapshot volume at the second site based on the second gold image corresponding to the first gold image ID; allocating storage for storing the update data at the second site with reference to the address information; and storing the update data in the allocated storage.

In some embodiments, the method further comprises providing a snapshot volume table which maintains at least information of a snapshot volume ID of the first snapshot volume and the first gold image ID of the first gold image. The method further comprises, upon receiving a request to write data to the first snapshot volume, allocating a chunk to a specified address of the first snapshot volume. The method further comprises providing a chunk table which maintains information of a chunk ID of the allocated chunk, a snapshot volume ID of the first snapshot volume, a start LBA (logical block address) of the specified address, and a number of blocks of the allocated chunk. The method further comprises allocating a virtual WWN (world wide name) to the first snapshot volume at the first site; sending the virtual WWN to the second site; and assigning the virtual WWN to the second snapshot volume at the second site. The method further comprises checking whether a gold image corresponding to the first gold image ID is at the second site; and, if the gold image corresponding to the first gold image ID is not at the second site, obtaining a third gold image corresponding to the first gold image ID from the third site, which is to be stored as the second gold image at the second site, by specifying the first gold image ID.

In specific embodiments, the system includes the first site to an N-th site each having a server and a storage system coupled to the server via a network. The first site has a plurality of gold images each corresponding to a gold image ID. Each of the sites except the first site and the third site periodically obtains gold images corresponding to the gold image IDs from the third site by specifying the gold image IDs corresponding to the gold images at the first site. Storing the first gold image at the first site comprises checking whether a portable media is designated as a source for the first gold image; if the portable media is the source, obtaining the first gold image from the portable media; and if the portable media is not the source, obtaining the first gold image from the third site.

In some embodiments, the first gold image is a first generation first gold image, the first snapshot volume is a first generation first snapshot volume, and the update data is first generation update data. The method further comprises, at an i-th generation starting with i=2 until i=N, after the i−1-th update data is written to the i−1-th generation first snapshot volume, using the i−1-th generation first snapshot volume as an i-th generation gold image to create an i-th generation first snapshot volume at the first site, so as to create an N-th generation first snapshot volume at the first site based on an N-th generation gold image; and sending the first gold image ID, the first generation to N-th generation update data, and address information for the first generation to N-th generation update data, from the first site to the second site. The method further comprises providing a snapshot volume table which maintains at least information of an i-th generation first snapshot volume ID of the i-th generation first snapshot volume and an i-th generation first gold image ID of the i-th generation first gold image associated with the i-th generation first snapshot volume, from i=1 to i=N.

In specific embodiments, the first gold image is a first generation first gold image, the first snapshot volume is a first generation first snapshot volume, and the update data is first generation update data. The method further comprises, at an i-th generation starting with i=2 until i=N, after the i−1-th update data is written to the i−1-th generation first snapshot volume, using the i−1-th generation first snapshot volume as an i-th generation gold image to create an i-th generation first snapshot volume at the first site, so as to create an N-th generation first snapshot volume at the first site based on an N-th generation gold image; combining all i-th generation update data to form a cumulative update data; storing the cumulative update data in the first storage system; and sending the first gold image ID, the cumulative update data, and address information for the cumulative update data, from the first site to the second site.

Another aspect of the invention is directed to a method of migrating a virtual server image in a system which includes a first site, a second site, and a third site, the first site having a first server and a first storage system coupled to the server via a first network, the second site including a second server and a second storage system coupled to the second server via a second network, the third site being coupled to the first site and the second site, the third site having a plurality of gold images, the virtual server image being migrated using the gold images. The method comprises checking whether there is update data for the virtual server image to be migrated. If there is update data, then the method comprises storing a first gold image at the first site; creating a first snapshot volume at the first site based on the first gold image, the first gold image corresponding to a first gold image ID; sending the first gold image ID, the update data of the first gold image, and address information for the update data, from the first site to the second site; storing a second gold image at the second site, the second gold image corresponding to the first gold image ID; creating a second snapshot volume at the second site based on the second gold image; allocating storage for storing the update data at the second site with reference to the address information; and storing the update data in the allocated storage. If there is no update data, then the method comprises storing a first gold image at the first site; creating a first snapshot volume at the first site based on the first gold image, the first gold image corresponding to a first gold image ID; sending the first gold image ID, from the first site to the second site; storing a second gold image at the second site, the second gold image corresponding to the first gold image ID; and creating a second snapshot volume at the second site based on the second gold image.

In some embodiments, the method further comprises checking whether a gold image corresponding to the first gold image ID is at the second site; and if the gold image corresponding to the first gold image ID is not at the second site, obtaining a third gold image corresponding to the first gold image ID from the third site, which is to be stored as the second gold image at the second site, by specifying the first gold image ID.

In accordance with another aspect of the present invention, a system for migrating a virtual server image comprises a first site having a first server and a first storage system coupled to the server via a first network; a second site including a second server and a second storage system coupled to the second server via a second network; and a third site being coupled to the first site and the second site, the third site having a plurality of gold images, the virtual server image being migrated using the gold images. The first storage system stores a first gold image, and creates a first snapshot volume based on the first gold image, the first gold image corresponding to a first gold image ID. The first site sends the first gold image ID, update data of the first gold image, and address information for the update data, to the second site. The second storage system stores a second gold image corresponding to the first gold image ID, creates a second snapshot volume based on the second gold image and the update data received at the second site, allocates storage for storing the update data at the second site with reference to the address information, and stores the update data in the allocated storage.

In some embodiments, the first storage system includes a snapshot volume table which maintains at least information of a snapshot volume ID of the first snapshot volume and the first gold image ID of the first gold image. The first site checks whether a portable media is designated as a source for the first gold image; if the portable media is the source, obtains the first gold image from the portable media; and if the portable media is not the source, obtains the first gold image from the third site.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of a system in which the method and apparatus of the invention may be applied.

FIG. 2 illustrates an example of a logical configuration of the invention applied to the hardware architecture of FIG. 1 according to a first embodiment of the invention.

FIG. 3 illustrates an exemplary data structure of a Gold Image table according to the first embodiment.

FIG. 4 illustrates an exemplary data structure of a snapshot volume table according to the first embodiment.

FIG. 5 illustrates an exemplary data structure of a chunk table.

FIG. 6 illustrates an example of a flow diagram of a process for importing a new Gold Image to the first on-premise site.

FIG. 7 illustrates an example of a flow diagram of a process for provisioning a new virtual server image by creating a snapshot volume from the Gold Image according to the first embodiment.

FIGS. 8 and 9 illustrate an example of flow diagram of a process for migrating virtual server image from the first on-premise site to another site according to the first embodiment.

FIG. 10 illustrates an example of a logical configuration of the invention applied to the hardware architecture of FIG. 1 according to a second embodiment of the invention.

FIG. 11 illustrates an exemplary data structure of a Gold Image table according to the second embodiment.

FIG. 12 illustrates an exemplary data structure of a snapshot volume table according to the second embodiment.

FIG. 13 illustrates an example of a flow diagram of a process for provisioning a new virtual server image from a customized snapshot volume according to the second embodiment.

FIG. 14 illustrates an example of flow diagram of a process for migrating virtual server image from the first on-premise site to another site according to the second embodiment.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for server image migration.

First Embodiment

1. Hardware Architecture

FIG. 1 illustrates an example of a hardware configuration of a system in which the method and apparatus of the invention may be applied. An on-premise site #1 131 is an IT system of enterprise composed of a plurality of servers 110 (110-1, 110-2, etc.) and a plurality of storage systems 100 (100-1, 100-2, etc.) which are connected with a network 120-1. An on-premise site #2 132 is a similar IT system as the on-premise site #1 131, and it may reside in the same location as the on-premise site #1 131 or it may be located in a remote location. Those IT systems are connected with a network 120-3. A cloud service 150 has a similar system of a cloud service site 160 as the on-premise sites 131, 132 and the enterprise may use its IT resource as well as the IT resources of the on-premise sites 131, 132. A management client 140 controls the entire IT resource management including the on-premise sites 131, 132 and the cloud service 150. A virtual appliance marketplace site 170 holds the Gold Image of virtual servers that the enterprise can download and deploy on either the on-premise site 131/132 or the cloud service 150.

Each storage system 100 includes a controller 101 and a plurality of storage mediums 105. The controller 101 includes a CPU 102, a memory 103, and a network interface 104. The storage mediums 105 are connected to the controller 101 and they may be various types of devices such as hard disk, flash memory, optical disk, and so on. Each server 110 is a generic computer that includes a CPU 111, a memory 112, and a network interface 113.

The management client 140 is a generic computer that includes a CPU 141, a memory 142, and a network interface 143. It is a terminal for an end user to operate IT resource management of the resources of the on premise sites 131, 132 and the cloud service 150.

2. Logical Element Structure

FIG. 2 illustrates an example of a logical configuration of the invention applied to the hardware architecture of FIG. 1 according to a first embodiment of the invention.

1) Virtual Servers on Physical Server

The physical servers 110 each have a hypervisor 250 which can logically produce and perform virtualized server instance for virtual servers 240. A single physical server 110 or hypervisor 250 on that server can generate and control a plurality of virtual servers (240-1, 240-2, etc.) at a time. Physical resources such as CPU, memory, and network interface are shared (or partitioned) among the plurality of virtual servers 240. Each virtual server 240 can execute applications respectively as if each virtual server 240 is running standalone.

2) Storage Volume Composition

An array group 200 is the logical capacity which is comprised of a plurality of storage mediums 105 to form a RAID group. For example, it may be composed as RAID 5 with 3 disks of data and 1 parity disk. A Gold Image 211 or a chunk pool 230 is a storage volume which is another logical capacity that is carved from the array group 200.

3) Gold Image Repository

An on-site Gold Image repository 210 is the container of Gold Images 211. Each Gold Image is an object-dedicated package having an OS, a middleware, and an application. When provisioning a new virtual server instance on the hypervisor 250, the Gold Image 211 will be used as a template of the virtual server image. The on-site Gold Image repository 210 holds a plurality of Gold Images 211 that the on-premise site #1 131 will use, such as an E-mail Gold Image having Windows 2008 and Exchange Server, for instance. A new Gold Image can be installed from a portable media 213. It may also be downloaded from the virtual appliance marketplace site 170 which is described later. In FIG. 2, one of the Gold Images 211 in the on-site repository 210 is identical to the Gold Image 212; however, for the purpose of description of the composition of storage volumes, they are placed in separate icons.

4) Gold Image and Snapshot Volume

As described above, the virtual server image that each respective virtual server 240 uses is created based upon the Gold Image 211. In FIG. 2, all snapshot volumes 220 (220-1, 220-2, etc.) are virtual server images that are created by making snapshots of the Gold Image 212. The snapshot volumes 220 originally have no capacity at first but are each just a logical storage volume which is related to the specific Gold Image 211. Each snapshot volume 220 (220-1, 220-2, etc.) will be associated with the respective virtual server 240 (240-1, 240-2, etc.) on the physical server 110. Once a read access reaches a snapshot volume 220-1, for instance, it then reads data from the corresponding part of the Gold Image 212. In the same manner, every read access to all snapshot volumes is processed by reading the data from the Gold Image 212. Therefore, the Gold Image data is shared by the snapshot volumes, and thus the total capacity will be reduced.

5) Data Write to Snapshot Volume

In this invention, the snapshot volumes 240 are not read-only volumes but are customizable independently. Thus, the snapshot function used here is called writeable snapshot. When a write request reaches a snapshot volume 220, it will carve a new chunk 231 from the chunk pool 230 and allocate the new chunk 231 to the snapshot volume 220 to write the requested data. The chunk pool capacity is shared by the snapshot volumes 220. If a read request reaches the address where the snapshot volume 220 has a chunk 231 to hold its specific data, it will be read from the chunk 231 and not from the original Gold Image 212. By utilizing the writeable snapshot feature, the storage system 100 can hold respective customized data for each virtual server image while it can share most of the common data by using the Gold Image 212. Hence it will maintain the high efficiency of capacity use. The data to be written to the snapshot volume 220 can be stored as update data and sent to the target site during virtual server image migration.

6) Virtual Appliance Marketplace Site

Virtual appliance is the term used for the Gold Image that is for dedicated use and typically used more as a market term (see http://www.vmware.com/appliances/). The virtual appliance marketplace site 170 holds plenty of Gold Images 261 in the public Gold Image repository 260. It is the marketplace from which a user can buy and download specific virtual server images. In this invention, it is assumed that each respective virtual appliance or Gold Image 261 has a global unique ID called a Gold Image ID to identify the Gold Image in a standardized fashion. The storage system 100 can download a Gold Image 261 by sending a request with its Gold Image ID to the virtual appliance marketplace site 170 and then store the downloaded Gold Image 261 into the on-site Gold Image repository 210 as a Gold Image 211.

7) Management Client

The management client 140 has a management client module 270 which is the user interface to control the entire virtual server Image provisioning or migration operations.

8) Software on the Storage System Controller

The storage system controller 101 includes a server image management module 280, a Gold Image table 500, a snapshot volume table 600, and a chunk table 700. The server image management module 280 is the primary module which executes virtual server image provisioning (snapshot from Gold Image) or virtual server image migration. The Gold Image table 500 holds records information for the Gold Images 211 stored in the on-site Gold Image repository 210. The snapshot volume table 600 holds records information for the snapshot volumes 220 such as which Gold Image is the parent of a snapshot, and each snapshot is assigned a virtual WWN (world wide name). The chunk table 700 holds records information for every chunk 231 that has been allocated to the snapshot volumes 220.

4. Data Structure

1) Gold Image Table

FIG. 3 illustrates an exemplary data structure of the Gold Image table 500 according to the first embodiment. The Gold Image table 500 holds information of each Gold Image 211 that is stored in the on-site Gold Image repository 210, including Gold Image ID 510, producer 520, and creation time 530. The Gold Image ID 510 is an identifier of the Gold Image 211. The producer 520 is information of the vendor or owner of the Gold Image. The creation time 530 is the date and time at which the Gold Image was created. For instance, row 591 of the Gold Image table 500 shows that the Gold Image having the Gold Image ID "G100" was produced by "Vendor A" at "2008.12.01 10:00." When the storage system 100 imports Gold Image data from the portable media 213 or downloads Gold Image data from the virtual appliance marketplace site 170, it will create a new record of this Gold Image table 500 in accordance with storing the Gold Image data to the on-site Gold Image repository 210.

2) Snapshot Volume Table

FIG. 4 illustrates an exemplary data structure of the snapshot volume table 600 according to the first embodiment. The snapshot volume table 600 holds information of each snapshot volume 220 that was created based upon the Gold Images 211, including snapshot volume ID 610, parent Gold Image ID 620, and virtual WWN 630. The snapshot volume ID 610 is an identifier of the snapshot volume 220. The parent Gold Image ID 620 is an identifier of the Gold Image that is associated with the snapshot volume 220. The virtual WWN 630 has a value that is assigned to the virtual server image (i.e., the snapshot volume). The virtual WWN can be carried over to the destination system when the virtual server 240 is migrated to another system. The virtual WWN is based on the N_Port ID Virtualization (NPIV) technology. For instance, row 691 shows that the snapshot volume 220 "SV101" was a snapshot from a Gold Image "G100" and its assigned virtual WWN is "50111110000000A1." The snapshot volume ID "SV102" in row 692 identifies a snapshot volume 220 that was a snapshot from the same Gold Image "G100" while the snapshot volume ID "SV201" in row 693 identifies a snapshot volume 220 that was generated from a different Gold Image "G200." Records are created when the server image management module 280 executes a new snapshot action (i.e., provisioning new virtual server image).

3) Chunk Table

FIG. 5 illustrates an exemplary data structure of the chunk table 700. The chunk table 700 holds information of each chunk 231 that is allocated to the snapshot volumes 220, including chunk ID 710, snapshot volume ID 720, start LBA (logical block address) 730, and number of blocks 740. The chunk ID 710 is an identifier of the chunk 231. The snapshot volume ID 720 is an identifier of the snapshot volume 220 to which the chunk 231 belongs. The start LBA 730 is the logical block address on the snapshot volume 220 which is the start address of the chunk 231. The number of blocks 740 is the number of valid blocks within the chunk 231.

For instance, row 791 represents a record of a chunk 231 which has "CK001" as the chunk ID 710, which belongs to the snapshot volume having the ID 720 "SV101," and which is stored from LBA "0" as the start LBA 730 with the valid "32" blocks as the number of blocks 740 from the beginning. During the allocation of the chunks 231 to the specific size of data, it will be broken down into blocks up to its maximum size of blocks (e.g., 32 blocks in this example). However, the end portion may not match exactly this boundary and hence it will often be less in length than the maximum blocks in a chunk. For instance, the number of blocks in row 792 shows it has only 25 blocks of valid data within the chunk. These records are created when the write request reaches the snapshot volume and a new chunk is carved from the chunk pool 230 to be used as the snapshot volume.

4. Process Flow

1) Process of Gold Image Store

FIG. 6 illustrates an example of a flow diagram of a process for importing a new Gold Image to the on-premise site #1 131. This process is performed by the server image management module 280. It is assumed that the target Gold Image ID has been given before the process starts.

In step 1100, the program allocates a new storage volume (for Gold Image 211) from the array group 200 of the storage system 100 into the on-site Gold Image repository 210. In step 1110, the program directs the process along different flow paths based on how the Gold Image is obtained. To import the Gold Image from the portable media 213, the process flows to step 1120. To download the Gold Image from the virtual appliance marketplace site 170, the process flows to step 1130. In step 1120, the program obtains the Gold Image data from the portable media 213 and stores the data to the storage volume 211 created in step 1100. In step 1130, the program obtains the Gold Image data from the virtual appliance marketplace site 170 by specifying the Gold Image ID. In step 1140, the process stores the obtained data in step 1130 to the storage volume 211 created in step 1100. After step 1120 or 1140, the process flows to step 1150 and inserts a new record into the Gold Image table 500 with the Gold Image ID 510, producer information 520 described in the obtained data, and its creation time 530.

Another approach of obtaining the Gold Image reduces the need to dynamically download the Gold Image during the migration process at the migration target site. This is achieved by periodically (and independently of the migration process) performing the download process such as a periodical background job for the target site. This may be a process to synchronize the Gold Image repository content of the all the sites (except for the virtual appliance marketplace site 170 which contains the Gold Images to be downloaded by the other sites) which are potential migration target sites. One option is to synchronize the download when the first site adds a new Gold Image by triggering the other potential migration target sites to download the added Gold Image from the virtual appliance marketplace site 170. Another option is to using polling. This method lets the other potential migration target sites to synchronize the download at their convenient times by checking the Gold Image repository content of the first site to download a Gold Image and, if there is new Gold Image (as identified by the Gold Image ID) which is not in any of the other potential migration target sites, the Gold Image will be downloaded for those target sites.

2) Process of Virtual Server Image Provisioning

FIG. 7 illustrates an example of a flow diagram of a process for provisioning a new virtual server image by creating a snapshot volume 220 from the Gold Image 212 according to the first embodiment. This process is performed by the server image management module 280. It is assumed that the target Gold Image ID and virtual server 240 which used the Gold Image 212 have been given before the process starts.

In step 1200, the program creates a new snapshot volume 220 based on the specified Gold Image 212 (it also creates a new ID for the snapshot volume). In step 1210, the program creates a new virtual WWN and assigns it to the snapshot volume 220. In step 1220, the program sets a path configuration of the snapshot volume 220 to the specified virtual server 240 so that the virtual server 240 can have access to the snapshot volume 220. In step 1230, the program inserts a new record into the snapshot volume table 600 with a new snapshot volume ID 610 of the snapshot volume 220, with the parent Gold Image ID 620 of the Gold Image used as the parent, and the virtual WWN 630 created in step 1210.

3) Process of Virtual Server Image Migration

FIGS. 8 and 9 illustrate an example of flow diagram of a process for migrating virtual server image (i.e., snapshot volume data content) from the on-premise site #1 131 to another site according to the first embodiment. The other site may be the on-premise site #2 132 or the cloud service site 160. This process is performed by the server image management module 280 residing on the migration source side and the server image management module 280 residing on the migration destination side. It is assumed that the migration target snapshot volume ID and the information of the destination site have been given before the process starts.

From step 1300 through step 1430, the Gold Image ID will be sent from the source site to the destination site, and the new snapshot volume will be created on the destination site based upon the received Gold Image ID. If the destination site does not have the specified Gold Image in the site, then it will download the Gold Image from the virtual appliance marketplace site 170. In step 1300 of FIG. 8, on the migration source side, the program selects a record from the snapshot volume table 600 which has the specified migration target snapshot volume ID, and obtains the Gold Image ID and virtual WWN from the record. In step 1310, the program sends the Gold Image ID and virtual WWN obtained in step 1300 to the destination site's server image management module 280. In step 1320, on the migration destination side, the program receives the sent Gold Image ID and virtual WWN. In step 1330, the program checks whether the specified Gold Image is in the on-site Gold Image repository 210 of the destination site. If it exists, then the program proceeds to step 1400 in FIG. 9; otherwise, the program proceeds to step 1340 in FIG. 8 to download the Gold Image. In step 1340, when the specified Gold Image is not found in the destination site, the program allocates a new storage volume from the array group 200 into the on-site Gold Image repository 210. In step 1350, the program obtains the Gold Image data from the virtual appliance marketplace site 170 by specifying the Gold Image ID. In step 1360, the program stores the obtained data in step 1350 to the storage volume created in step 1340.

In step 1400 of FIG. 9, still on the migration destination side, the program creates a new snapshot volume based on the Gold Image in the on-site Gold Image repository 210. In step 1410, the program assigns the virtual WWN which is received from the migration source side in step 1320 to the snapshot volume created in step 1400. In step 1420, the program sets a path configuration of the snapshot volume to the virtual server that will have access to the Gold Image in the destination site. In step 1430, the program inserts a new record into the snapshot volume table 600 with a new snapshot volume ID 610 of the snapshot volume, the parent Gold Image ID 620 of the Gold Image used as parent, and the virtual WWN 630.

From step 1440 through step 1500, the customized data address information and its content will be sent from the source side to the destination side, and it will be applied to the created snapshot volume on the destination side.

In step 1440, back on the migration source side, the program selects records from the chunk table 700 where the snapshot volume ID 720 matches the migration source snapshot volume. If any record is found, then the program proceeds to step 1450; otherwise, the program ends the migration process because all chunks have been processed. In step 1450, the program sends the "Start LBA" 730 and "Number of Blocks" 740 information obtained from the record to the destination side. In step 1460, on the destination side, the program receives the sent "Start LBA" 730 and "Number of Blocks" 740 of a chunk from the source side. In step 1470, the program allocates a new chunk from the chunk pool to the created snapshot volume in step 1400. In step 1480, again on the source side, the program sends the actual content data of the chunk. In step 1490, on the destination side, the program receives the sent content data of the chunk and stores it to the new chunk allocated in step 1470. In step 1500, the program inserts a new record to the chunk table 700 with the new Chunk ID 710, snapshot volume ID 720 to which the chunk belongs (i.e., snapshot volume created in step 1400), and the received "Start LBA" and "Number of Blocks" in step 1460.

Second Embodiment

The Gold Image is a template of the virtual server image when a new virtual server is provisioned. For instance, in an enterprise, the IT administrator can deploy a new virtual server instance from the Gold Image when a new project has started. However, after customizing the provisioned/snapshot virtual server image, it may be desired to share and use that customized virtual server image within a plurality of projects. Therefore, in the second embodiment, the capability of the hierarchy of the Gold Image and snapshot volume and its migration method are disclosed. With this technique, a variety of Gold Images which are slightly customized from the original can be produced in a flexible manner and still the total capacity of the required storage is minimized. Most of the components and characteristics are the same as those in the first embodiment. The following discussion focuses mainly on the differences.

1. Logical Element Structure

FIG. 10 illustrates an example of a logical configuration of the invention applied to the hardware architecture of FIG. 1 according to a second embodiment of the invention. In the second embodiment, FIG. 10 illustrates the Gold Image and snapshot volume recursive composition.

Similar to the first embodiment described above, the snapshot volumes 320 and 321 (second generation) in FIG. 10 are snapshots based on the Gold Image 310 (first generation). However, as seen in FIG. 10, another snapshot has been executed for which the snapshot volume 330 (third generation) is generated based on the snapshot volume 320 in the second generation. In this aspect, the snapshot volume 320 can be realized as the new parent Gold Image of the newly created snapshot volume 330 in the third generation. That is, the first generation Gold Image 310 is used to generate the first generation snapshot volumes 321 and 320. After update data is written to the first generation snapshot volumes 321 and 320, the first generation snapshot volume 320 is used as the second generation Gold Image 320 for generating the second generation snapshot volume 330 which will become the third generation Gold Image, and so on. Thus, the very original root Gold Image 310 can be characterized as the first generation of the hierarchy of the Gold Images, and the Gold Image 320 (snapshot of Gold Image 310) can be characterized as the second generation and so on. At the edge of the linkage identified as the N-th generation of the Gold Image 340 is used to create the N-th generation snapshot volumes 350 and 351. In other words, at an i-th generation starting with i=2 until i=N, after the i−1-th update data is written to the i−1-th generation snapshot volume, the i−1-th generation snapshot volume as an i-th generation Gold Image is used to create an i-th generation snapshot volume, so as to create an N-th generation snapshot volume based on an N-th generation Gold Image eventually.

According to another approach, the first site combines all i-th generation update data to form a cumulative update data, stores the cumulative update data in the first storage system, and sends the first gold image ID, the cumulative update data, and address information for the cumulative update data, from the first site to the second site.

2. Data Structure

1) Gold Image Table

FIG. 11 illustrates an exemplary data structure of the Gold Image table 500 according to the second embodiment. Its schema is actually no different from that of the first embodiment (see FIG. 3). However, a new entry is used for the producer column 520 to represent that the Gold Image is created internally in this system and also to represent its position (second or further generation of Gold Image) in the linkage or hierarchy. For instance, row 592 shows that the Gold Image having the Gold Image ID "G310" was produced by "Vendor B" and it represents that "G310" is a root Gold Image of a linkage. On the other hand, row 893 shows that the Gold Image having the Gold Image ID "G320" was created internally in this system.

2) Snapshot Volume Table

FIG. 12 illustrates an exemplary data structure of a snapshot volume table 900 according to the second embodiment. Its schema is the same as that of the first embodiment (see FIG. 4) but the usage is somewhat different. For instance, similar to the first embodiment, row 991 shows that the snapshot volume having the snapshot volume ID "SV320" is a snapshot made from the Gold Image "G310," and so is the snapshot volume having the snapshot volume ID "SV321" in row 992. In row 993, the snapshot volume ID "SV320" appears again but this time it is not on the "Snapshot Volume ID" column 910 but on the "Parent Gold Image ID" column 920. This means that the snapshot volume "SV320" was originally a snapshot made from the Gold Image "G310" but is now used as a Gold Image, and that the snapshot volume "SV330" was created based on the snapshot "SV320" serving as the parent Gold Image. As shown in FIG. 10, the snapshot volume "SV350" was at the edge of the linkage. On the snapshot volume table 900 of FIG. 12, from row 997 those linkages can be retrieved by connecting the parent relation one to another recursively. In FIG. 12, each arrow indicates that a new generation of the Gold Image was created in a particular row. Other rows with no arrows each represent just a snapshot from the existing Gold Image.

3. Process Flow

4) Process of Snapshot Involving Another Generation (by Virtual Server Image Provisioning)

FIG. 13 illustrates an example of a flow diagram of a process for provisioning a new virtual server image from a customized snapshot volume according to the second embodiment (i.e., creating another generation of the Gold Image linkage). This process is performed by the server image management module 280. It is assumed that the snapshot volume ID of the snapshot volume to be the new Gold Image has been given before the process starts.

In step 1600, the program creates a new snapshot volume (child) based on the specified snapshot volume (parent), and creates a new snapshot volume ID for the child snapshot volume. In step 1610, the program creates a new virtual WWN and assigns it to the new snapshot volume. In step 1620, the program sets a path configuration of the new snapshot volume to the virtual server 240. In step 1630, the program inserts a new record into the snapshot volume table 900 with the new ID of the child snapshot volume created in step 1600, the original snapshot volume's ID for the parent Gold Image ID, and the created virtual WWN in step 1610. In step 1640, the program inserts a new record into the Gold Image table 500 with the snapshot volume ID (parent) as the Gold Image ID 510 on which the creation of the child snapshot volume was based, with the producer 520 labeled as "Internal," and with the current time as the creation time 530.

5) Process of Virtual Server Image Migration

FIG. 14 illustrates an example of flow diagram of a process for migrating virtual server image from the on-premise site #1 131 to another site according to the second embodiment, which may be the on-premise site #2 132 or the cloud service Site 160. In this embodiment, when a virtual server image is selected to migrate, the entire customization (i.e., all chunks which have updates) associated from the root Gold Image to the edge snapshot volume that is specified will be collected first and then it is sent to the migration destination as the total difference from the original Gold Image. Similar to the first embodiment, the published Gold Image content can be obtained from the migration destination site such as the remote on-premise site #2 132 or the cloud service site 160 by specifying the global unique identifier Gold Image ID. Hence, in the second embodiment, the source site needs to gather the rest of the customization and send it to the destination site. The process on the migration destination side is the same as that described above for the first embodiment. The following discussion will focus on the source side and the aspects that are different from the first embodiment.

From step 1700 through step 1750, the program follows the linkage of the Gold Image recursively based on the information in the snapshot volume table 900. During this process, the program it will gather all customized data and at last will determine the root Gold Image ID.

In step 1700, the program creates a temporary table having chunk table columns. This will be used to store the entire customization data. In step 1710, the program initializes the variable v_SnapshotVolumeID to the migration target snapshot volume's ID. The variable will hold the currently focused snapshot volume ID during the loop of step 1720 to step 1750. In step 1720, the program selects a record from the snapshot volume table 900 which has the v_SnapshotVolumeID and obtains its parent Gold Image ID and sets it to the v_GoldImageID which holds the Gold Image ID currently focused during the loop. In step 1730, the program selects a record from the original chunk table 700 where the snapshot volume ID is v_SnapshotVolumeID (i.e., collecting records related to this generation Gold Image) and copies the record into the temporary chunk table created in step 1700. If a record to be added has the same "Start LBA" as the existing record in the original chunk table 700 (it means that the same address data has been overwritten by the newer generation), then the program skips the step of copying the record (because it does not need to be sent to the destination). In step 1740, the program selects a record from the snapshot volume table 900 where the snapshot volume ID column is v_GoldImageID (this looks up whether the Gold Image of this snapshot volume was originally a snapshot made from some other older Gold Image or not). If it has a further parent Gold Image, then the program proceeds to step 1750; otherwise, this Gold Image was not a snapshot from any other image but it is the root Gold Image, and the program proceeds to step 1760. In step 1750, the program sets the v_SnapshotVolumeID to the found parent Gold Image ID and proceeds back to step 1720 for the previous generation.

In step 1760, the program sends the v_GoldImageID (root Gold Image ID) and virtual WWN of the migration target snapshot volume (this can be obtained in the first loop of step 1720) to the destination site. (On the destination site step 1320 to step 1430 described above in connection with the first embodiment will be executed.) In step 1770, the program selects a record from the temporary chunk table created in step 1700. If any record is found, then the program proceeds to step 1450; otherwise, the migration process ends because all chunks have been processed. The other steps are the same as those discussed above in connection with the first embodiment.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for server image migration. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of migrating a virtual server image in a system which includes a first site, a second site, and a third site, the first site having a first server and a first storage system coupled to the server via a first network, the second site including a second server and a second storage system coupled to the second server via a second network, the third site being coupled to the first site and the second site, the third site having a plurality of gold images, the virtual server image being migrated using the gold images, the method comprising:

storing, by the first storage system, a first gold image at the first storage system;

creating, by the first storage system, a first snapshot volume at the first storage system based on the first gold image, the first gold image corresponding to a first gold image ID;

sending, by the first storage system, the first gold image ID, update data of the first gold image, and address information for the update data, from the first storage system to the second storage system;

checking whether a gold image corresponding to the first gold image ID is at the second site;

when the gold image corresponding to the first gold image ID is at the second site, storing, by the second storage system, the gold image corresponding to the first gold image ID as a second gold image at the second storage system;

when the gold image corresponding to the first gold image ID is not at the second site, obtaining, by the second storage system, a third gold image corresponding to the first gold image ID from the third site by specifying the first gold image ID, and storing the third gold image as a second gold image at the second storage system;

creating, by the second storage system, a second snapshot volume at the second storage system based on the second gold image corresponding to the first gold image ID;

allocating, by the second storage system, storage for storing the update data at the second storage system with reference to the address information; and storing, by the second storage system, the update data in the allocated storage.

2. The method according to claim 1, further comprising:
providing a snapshot volume table which maintains at least information of a snapshot volume ID of the first snapshot volume and the first gold image ID of the first gold image.

3. The method according to claim 1, further comprising:
upon receiving a request to write data to the first snapshot volume, the first storage system allocating a chunk to a specified address of the first snapshot volume.

4. The method according to claim 3, further comprising:
providing a chunk table which maintains information of a chunk ID of the allocated chunk, a snapshot volume ID of the first snapshot volume, a start LBA (logical block address) of the specified address, and a number of blocks of the allocated chunk.

5. The method according to claim 1, further comprising:
allocating a virtual WWN (world wide name) to the first snapshot volume at the first storage system;
sending, by the first storage system, the virtual WWN to the second storage system; and
assigning the virtual WWN to the second snapshot volume at the second storage system.

6. The method according to claim 1,
wherein the system includes the first site to an N-th site each having a server and a storage system coupled to the server via a network;
wherein the first storage system has a plurality of gold images each corresponding to a gold image ID; and
wherein each of the storage systems except the storage systems at the first site and the third site periodically obtains gold images corresponding to the gold image IDs from the third site by specifying the gold image IDs corresponding to the gold images at the first storage system.

7. The method according to claim 1, wherein storing the first gold image at the first storage system comprises:
checking whether a portable media is designated as a source for the first gold image;
when the portable media is the source, the first storage system obtaining the first gold image from the portable media; and
when the portable media is not the source, the first storage system obtaining the first gold image from the third site.

8. The method according to claim 1, wherein the first gold image is a first generation first gold image, the first snapshot volume is a first generation first snapshot volume, and the update data is first generation update data, the method further comprising:
at an i-th generation starting with i=2 until i=N, after the i-1-th update data is written to the i-1-th generation first snapshot volume, using the i-1-th generation first snapshot volume as an i-th generation gold image to create an i-th generation first snapshot volume at the first storage system, so as to create an N-th generation first snapshot volume at the first storage system based on an N-th generation gold image; and
sending, by the first storage system, the first gold image ID, the first generation to N-th generation update data, and address information for the first generation to N-th generation update data, from the first storage system to the second storage system.

9. The method according to claim 8, further comprising:
providing a snapshot volume table which maintains at least information of an i-th generation first snapshot volume ID of the i-th generation first snapshot volume and an i-th generation first gold image ID of the i-th generation first gold image associated with the i-th generation first snapshot volume, from i=1 to i=N.

10. The method according to claim 1, wherein the first gold image is a first generation first gold image, the first snapshot volume is a first generation first snapshot volume, and the update data is first generation update data, the method further comprising:
at an i-th generation starting with i=2 until i=N, after the i-1-th update data is written to the i-1-th generation first snapshot volume, using the i-1-th generation first snapshot volume as an i-th generation gold image to create an i-th generation first snapshot volume at the first storage system, so as to create an N-th generation first snapshot volume at the first storage system based on an N-th generation gold image;
combining all i-th generation update data to form a cumulative update data;
storing, by the first storage system, the cumulative update data in the first storage system; and
sending, by the first storage system, the first gold image ID, the cumulative update data, and address information for the cumulative update data, from the first storage system to the second storage system.

11. A method of migrating a virtual server image in a system which includes a first site, a second site, and a third site, the first site having a first server and a first storage system coupled to the server via a first network, the second site including a second server and a second storage system coupled to the second server via a second network, the third site being coupled to the first site and the second site, the third site having a plurality of gold images, the virtual server image being migrated using the gold images, the method comprising:

checking whether there is update data for the virtual server image to be migrated;
when there is update data, then
storing, by the first storage system, a first gold image at the first storage system;
creating, by the first storage system, a first snapshot volume at the first storage system based on the first gold image, the first gold image corresponding to a first gold image ID;
sending, by the first storage system, the first gold image ID, the update data of the first gold image, and address information for the update data, from the first storage system to the second storage system;
checking whether a gold image corresponding to the first gold image ID is at the second site;
when the gold image corresponding to the first gold image ID is at the second site, storing, by the second storage system, the gold image corresponding to the first gold image ID as a second gold image at the second storage system;
when the gold image corresponding to the first gold image ID is not at the second site, obtaining, by the second storage system, a third gold image corresponding to the first gold image ID from the third site by specifying the first gold image ID, and storing the third gold image as a second gold image at the second storage system;
creating, by the second storage system, a second snapshot volume at the second storage system based on the second gold image;
allocating, by the second storage system, storage for storing the update data at the second storage system with reference to the address information; and
storing, by the second storage system, the update data in the allocated storage; and
when there is no update data, then
storing, by the first storage system, a first gold image at the first storage system;
creating, by the first storage system, a first snapshot volume at the first storage system based on the first gold image, the first gold image corresponding to a first gold image ID;
sending, by the first storage system, the first gold image ID, from the first storage system to the second storage system;
checking whether a gold image corresponding to the first gold image ID is at the second site;
when the gold image corresponding to the first gold image ID is at the second site, storing, by the second storage system, the gold image corresponding to the first gold image ID as a second gold image at the second storage system;
when the gold image corresponding to the first gold image ID is not at the second site, obtaining, by the second storage system, a third gold image corresponding to the first gold image ID from the third site by specifying the first gold image ID, and storing the third gold image as a second gold image at the second storage system; and
creating, by the second storage system, a second snapshot volume at the second storage system based on the second gold image.

12. The method according to claim 11, further comprising:
providing a snapshot volume table which maintains at least information of a snapshot volume ID of the first snapshot volume and the first gold image ID of the first gold image.

13. A system for migrating a virtual server image, the system comprising:
a first site having a first server and a first storage system coupled to the server via a first network;
a second site including a second server and a second storage system coupled to the second server via a second network; and
a third site being coupled to the first site and the second site, the third site having a plurality of gold images, the virtual server image being migrated using the gold images;
wherein the first storage system stores a first gold image, and creates a first snapshot volume based on the first gold image, the first gold image corresponding to a first gold image ID;
wherein the first storage system sends the first gold image ID, update data of the first gold image, and address information for the update data, to the second storage system;
wherein the second storage system checks whether a gold image corresponding to the first gold image ID is at the second site, and
when the gold image corresponding to the first gold image ID is at the second site, stores the gold image corresponding to the first gold image ID as a second gold image at the second storage system, and
when the gold image corresponding to the first gold image ID is not at the second site, obtains a third gold image corresponding to the first gold image ID from the third site by specifying the first gold image ID and stores the third gold image as a second gold image at the second storage system, and
wherein the second storage system creates a second snapshot volume based on the second gold image and the update data received at the second storage system, allocates storage for storing the update data at the second storage system with reference to the address information, and stores the update data in the allocated storage.

14. The system according to claim 13,
wherein the first storage system includes a snapshot volume table which maintains at least information of a snapshot volume ID of the first snapshot volume and the first gold image ID of the first gold image.

15. The system according to claim 13, wherein the first storage system:
checks whether a portable media is designated as a source for the first gold image;
when the portable media is the source, obtains the first gold image from the portable media; and
when the portable media is not the source, obtains the first gold image from the third site.

16. The system according to claim 13,
wherein the first gold image is a first generation first gold image, the first snapshot volume is a first generation first snapshot volume, and the update data is first generation update data;
wherein at an i-th generation starting with i=2 until i=N, after the i-1-th update data is written to the i-1-th generation first snapshot volume, the first storage system uses the i-1-th generation first snapshot volume as an i-th generation gold image to create an i-th generation first snapshot volume at the first storage system, so as to create an N-th generation first snapshot volume at the first storage system based on an N-th generation gold image; and wherein the first storage system sends the first gold image ID, the first generation to N-th generation update data, and address information for the first generation to N-th generation update data, from the first storage system to the second storage system.

17. The system according to claim 16,
wherein the first storage system provides a snapshot volume table which maintains at least information of an i-th generation first snapshot volume ID of the i-th generation first snapshot volume and an i-th generation first gold image ID of the i-th generation first gold image, from i=1 to i=N.

18. The system according to claim 13,
wherein the first gold image is a first generation first gold image, the first snapshot volume is a first generation first snapshot volume, and the update data is first generation update data;
wherein at an i-th generation starting with i=2 until i=N, after the i-1-th update data is written to the i-1-th generation first snapshot volume, the first storage system uses the i-1-th generation first snapshot volume as an i-th generation gold image to create an i-th generation first snapshot volume at the first storage system, so as to create an N-th generation first snapshot volume at the first storage system based on an N-th generation gold image;

wherein the first storage system combines all i-th generation update data to form a cumulative update data, and stores the cumulative update data; and wherein the first storage system sends the first gold image ID, the cumulative update data, and address information for the cumulative update data, to the second storage system.

19. The system according to claim 13,
wherein the first storage system, upon receiving a request to write data to the first snapshot volume, allocates a chunk to a specified address of the first snapshot volume, and includes a chunk table which maintains information of a chunk ID of the allocated chunk, a snapshot volume ID of the first snapshot volume, a start LBA (logical block address) of the specified address, and a number of blocks of the allocated chunk.

20. The system according to claim 13,
wherein the first storage system allocates a virtual WWN (world wide name) to the first snapshot volume at the first storage system, and sends the virtual WWN to the second storage system; and
wherein the second storage system assigns the virtual WWN to the second snapshot volume at the second storage system.

* * * * *